(12) United States Patent
Hayashi et al.

(10) Patent No.: US 11,053,367 B2
(45) Date of Patent: Jul. 6, 2021

(54) COMPOSITION FOR POLYURETHANE FOAM CONTAINING POLYROTAXANE, POLYURETHANE FOAM DERIVED FROM COMPOSITION, AND METHOD FOR PRODUCING POLYURETHANE FOAM

(71) Applicants: ASM INC., Chiba (JP); YUKIGAYA CHEMICAL INDUSTRY CO., LTD., Tokyo (JP)

(72) Inventors: Yuki Hayashi, Kashiwa (JP); Masanobu Takaoka, Kashiwa (JP); Masamichi Komatsuzaki, Inashiki (JP); Rawiwan Wongnak, Inashiki (JP)

(73) Assignees: ASM INC., Chiba (JP); YUKIGAYA CHEMICAL INDUSTRY CO., LTD., Tokyo (JP)

( * ) Notice: Subject to any disclaimer, the term of this patent is extended or adjusted under 35 U.S.C. 154(b) by 67 days.

(21) Appl. No.: 16/072,866

(22) PCT Filed: Jan. 25, 2017

(86) PCT No.: PCT/JP2017/002444
§ 371 (c)(1),
(2) Date: Jul. 25, 2018

(87) PCT Pub. No.: WO2017/130998
PCT Pub. Date: Aug. 3, 2017

(65) Prior Publication Data
US 2018/0371199 A1 Dec. 27, 2018

(30) Foreign Application Priority Data
Jan. 26, 2016 (JP) .............................. JP2016-012671

(51) Int. Cl.
| | | |
|---|---|---|
| C08G 18/48 | (2006.01) | |
| C08J 9/00 | (2006.01) | |
| C08G 18/32 | (2006.01) | |
| C08G 18/76 | (2006.01) | |
| C08G 18/24 | (2006.01) | |
| C08G 18/64 | (2006.01) | |
| C08G 18/12 | (2006.01) | |
| A45D 33/00 | (2006.01) | |
| A45D 34/04 | (2006.01) | |
| A45D 40/26 | (2006.01) | |
| C08J 9/12 | (2006.01) | |
| C08L 75/08 | (2006.01) | |

(52) U.S. Cl.
CPC ............ *C08J 9/0061* (2013.01); *A45D 33/00* (2013.01); *A45D 34/04* (2013.01); *A45D 40/26* (2013.01); *C08G 18/12* (2013.01); *C08G 18/248* (2013.01); *C08G 18/3206* (2013.01); *C08G 18/4812* (2013.01); *C08G 18/4825* (2013.01); *C08G 18/4829* (2013.01); *C08G 18/6484* (2013.01); *C08G 18/7642* (2013.01); *C08J 9/125* (2013.01); *C08L 75/08* (2013.01); *A45D 2200/1009* (2013.01); *C08J 2203/10* (2013.01); *C08J 2375/08* (2013.01); *C08J 2487/00* (2013.01); *C08L 2203/14* (2013.01)

(58) Field of Classification Search
CPC ........ A45D 33/00; A45D 34/04; A45D 40/26; A45D 2200/1009; C08G 18/12; C08G 18/248; C08G 18/3206; C08G 18/4812; C08G 18/4825; C08G 18/4829; C08G 18/6484; C08G 18/4642; C08J 9/0061; C08J 9/125; C08J 2203/10; C08J 2375/08; C08J 2487/00; C08L 75/08; C08L 2203/14
See application file for complete search history.

(56) References Cited

U.S. PATENT DOCUMENTS

| | | | |
|---|---|---|---|
| 2005/0065225 A1 | 5/2005 | Nakamura et al. | |
| 2006/0247325 A1 | 11/2006 | Semba | |
| 2011/0124823 A1 | 5/2011 | Hayashi et al. | |
| 2016/0304689 A1* | 10/2016 | Takemoto | ............... C08J 9/0061 |
| 2016/0304690 A1* | 10/2016 | Takemoto | .......... C08G 18/6484 |

FOREIGN PATENT DOCUMENTS

| | | | | |
|---|---|---|---|---|
| CA | 2898287 A1 * | 7/2014 | ............... | C08L 5/16 |
| JP | 2005-60643 A | 3/2005 | | |
| JP | 2011-038005 A | 2/2011 | | |
| JP | 2011-241401 A | 12/2011 | | |
| WO | 2005/047360 A1 | 5/2005 | | |
| WO | 2013/099842 A1 | 7/2013 | | |
| WO | 2015/174187 A1 | 11/2015 | | |

OTHER PUBLICATIONS

International Search Report dated Mar. 7, 2017, issued in corresponding International Application No. PCT/JP2017/00244, filed Jan. 25, 2017, 4 pages.
Written Opinion of the International Search Authority dated Mar. 7, 2017, issued in corresponding International Application No. PCT/JP2017/00244, filed Jan. 25, 2017, with English translation, 8 pages.

\* cited by examiner

*Primary Examiner* — John M Cooney
(74) *Attorney, Agent, or Firm* — Christensen O'Connor Johnson Kindness PLLC

(57) ABSTRACT

The present invention provides: a polyurethane foam having excellent viscoelastic characteristics and/or excellent feeling; a composition for the polyurethane foam; and a method for producing the polyurethane foam. The present invention provides a composition for a polyurethane foam, the composition containing: (A) a polyol having three or more OH groups; (B) a compound having two or more isocyanate groups; and (C) a polyrotaxane obtained as a result of arranging, on both ends of a pseudo-polyrotaxane formed through skewering-like inclusion of a linear molecule through the openings of cyclic molecules, stopper groups so that the cyclic molecules do not dissociate from the pseudo-polyrotaxane.

7 Claims, No Drawings

COMPOSITION FOR POLYURETHANE FOAM CONTAINING POLYROTAXANE, POLYURETHANE FOAM DERIVED FROM COMPOSITION, AND METHOD FOR PRODUCING POLYURETHANE FOAM

TECHNICAL FIELD

The present invention relates to a composition used for a polyurethane foam comprising a polyrotaxane, a polyurethane foam derived from the composition, and a method for producing a polyurethane foam.

BACKGROUND ART

Polyurethane foams have been conventionally used as various materials such as washing tools, cosmetic puffs, cushioning materials, manufacturing materials and industrial materials.

The properties required for polyurethane foams vary depending on circumstances that the polyurethane foams are used. In order to achieve the properties, it is required to appropriately select both raw materials and a processing method for preparing the polyurethane foam.

Further, unlike homogeneous curable materials, polyurethane foams are prepared from an inhomogeneous dispersion system of gas and solid, and thus it is difficult to control physical balances obtained by selection or blending ratios of raw materials used and reactions in a processing method used, and thus, there are cases where desired properties cannot be obtained even by any type of combination.

Patent Document 1 discloses a polyurethane foam produced from a polyisocyanate and a polycarbonate polyol and a method for producing the same, in order to overcome the drawbacks of polyurethane foams, such as deterioration due to hydrolyzability, heat and ultraviolet rays.

Further, Patent Document 2 discloses a producing method of a soft polyurethane foam by using the mechanical frothing process, in which drawbacks, for example, too hard because of high density, lack of softness and the like, of producing methods of a soft polyurethane foam by using the mechanical frothing process are improved.

A polyurethane foam disclosed in Patent Document 1 or Patent Document 2, however, does not have desirable properties, in particular viscoelasticity when used for e.g., a cushioning material and a cosmetic puff. Therefore, there are an increased needs for polyurethane foams having desirable viscoelasticity, in particular having reduced compression set, improved durability and improved softness.

On the other hand, a polyrotaxane has properties that, when a cyclic molecule constituting the polyrotaxane moves on the linear molecule, excellent viscoelasticity occur in a crosslinked body of polyrotaxanes, a crosslinked body of a polyrotaxane and a polymer other than the polyrotaxane, and the like. For this reason, the polyrotaxane is expected to be applied to various use applications, and thus, research and development thereof have been actively conducted.

For example, Patent Document 3 discloses a polyurethane having an excellent softness and extension rate by using a homogeneous polyurethane mixture in combination with a polyrotaxane.

However, Patent Document 3 just discloses a homogeneous reaction system and does not disclose a foam material, i.e., a foaming material at all.

PRIOR ART DOCUMENT

Patent Document

Patent Document 1: JP-A1-2005-060643.
Patent Document 2: JP-A1-2011-038005.
Patent Document 3: WO2010/024431.

DISCLOSURE OF THE INVENTION

Problems to be Solved by the Invention

An object of the present invention is to provide a composition used for a polyurethane foam comprising a polyrotaxane, a polyurethane foam derived from the composition, and a method for producing a polyurethane foam.

Specifically, an object of the present invention is to provide a polyurethane foam having excellent viscoelasticity, in particular, a polyurethane foam having reduced compression set, improved durability, improved softness, a composition used for the polyurethane foam, and a method for producing the polyurethane foam.

Further, an object of the present invention is, in addition to, or other than the above objects, to provide a polyurethane foam having good feeling and/or contact feeling, and strong stiffness, a composition used for the polyurethane foam, and a method for producing the polyurethane foam.

Means for Solving Problems

The present inventors have found the following inventions:

<1> A composition used for a polyurethane foam comprising:
(A) a polyol having three or more OH groups;
(B) a compound having two or more isocyanate groups; and
(C) a polyrotaxane comprising a pseudopolyrotaxane, which has a linear molecule and a cyclic molecule (s) in which the linear molecule is included in a cavity (cavities) of the cyclic molecule(s) in a skewered manner, and capping groups, each of which locates at each end of the pseudopolyrotaxane in order to prevent the dissociation of the cyclic molecule (s).

<2> In the above item <1>, an average molecular weight of the (A) polyol having three or more OH groups may range from 250 to 8000, preferably from 800 to 6000, more preferably from 1000 to 4000. Furthermore, unless the description that the average molecular weight is a number average molecular weight or a weight average molecular weight is noted, the average molecular weight is a value determined by (m×1000×56/OHV), wherein OHV (mg KOH/g) is a hydroxyl value measured in accordance with JIS K 0070 and m represents the number of functional groups.

<3> In the above item <1> or <2>, the composition used for a polyurethane foam may comprise mixed polyols which comprises the (A) polyol having three or more OH groups.

<4> In the above item <3>, an amount of the (A) polyol having three or more OH groups may range from 20 to 90 parts by weight, preferably 30 to 85 parts by weight, more preferably 40 to 80 parts by weight in 100 parts by weight of the mixed polyols.

<5> In the above item <3> or <4>, an amount of the (C) polyrotaxane may range from 1.0 to 15.0 parts by weight, preferably 3.0 to 12.0 parts by weight, more preferably 4.0 to 11.0 parts by weight, most preferably 5.0 to 10.0 parts by weight against 100 parts by weight of the mixed polyols.

<6> In anyone of the above items <3> to <5>, a ratio of a molar amount of isocyanate groups in the (B) compound having two or more isocyanate groups to a molar amount of active hydrogens in the composition used for the polyurethane foam ((a molar amount of isocyanate groups in the (B) compound having two or more isocyanate groups)/(a molar amount of active hydrogens in the composition used for the polyurethane foam)) may ranges from 0.50 to 1.80, preferably from 0.70 to 1.60, more preferably from 0.80 to 1.20.

<7> A polyurethane foam derived from the composition used for the polyurethane foam according to anyone of the above items <1> to <6>.

<8> In the above item <7>, an apparent density of the polyurethane foam may range from 50 to 180 kg/m$^3$, preferably from 70 to 160 kg/m$^3$, more preferably from 80 to 140 kg/m$^3$.

<9> In the above item <7> or <8>, a compression set of the polyurethane foam may be 40% or less, preferably 35% or less, more preferably 20% or less. Furthermore, the "compression set" used herein means one measured in accordance with JIS K6400-4 at 70° C. at a compression rate of 50% for 22 hours.

<10> A material formed of one comprising the polyurethane foam according to anyone of the above items <7> to <9>. Alternatively, a material consisting essentially of the polyurethane foam according to anyone of the above items <7> to <9>. Alternatively, a material consisting of the polyurethane foam according to anyone of the above items <7> to <9>.

<11> In the above item<10>, the material may be a cosmetic sponge.

<12> In the above item <10>, the material may be a cushioning material.

<13> A method for producing a polyurethane foam comprising the steps of:

1) preparing (A) a polyol having three or more OH groups;

2) preparing (B) a compound having two or more isocyanate groups;

3) preparing (C) a polyrotaxane comprising a pseudopolyrotaxane, which has a linear molecule and a cyclic molecule (s) in which the linear molecule is included in a cavity (cavities) of the cyclic molecule (s) in a skewered manner, and capping groups, each of which locates at each end of the pseudopolyrotaxane in order to prevent the dissociation of the cyclic molecule (s); and.

4) mixing the (A) polyol having three or more OH groups, the (B) compound having two or more isocyanate groups, the (C) polyrotaxane, a foaming agent, and a foam stabilizer, to foam and react the mixture; to obtain the polyurethane foam.

Effects of the Invention

The present invention can provide a polyurethane foam having excellent viscoelasticity, in particular, a polyurethane foam having reduced compression set, improved durability, improved softness, a composition used for the polyurethane foam, and a method for producing the polyurethane foam.

Further, the present invention can provide, in addition to, or other than the above effects, a polyurethane foam having good feeling and/or contact feeling, and strong stiffness, a composition used for the polyurethane foam, and a method for producing the polyurethane foam.

EMBODIMENTS FOR CARRYING OUT THE INVENTION

The present invention described in the present application will be described in detail hereinafter.

The present application discloses a composition used for a polyurethane foam comprising a polyrotaxane, a polyurethane foam derived from the composition, and a method for producing a polyurethane foam. Hereinafter, these will be described in order.

<A Composition Used for a Polyurethane Foam>

The present application discloses a composition used for a polyurethane foam comprising (A) a polyol having three or more OH groups;

(B) a compound having two or more isocyanate groups; and (C) a polyrotaxane comprising a pseudopolyrotaxane, which has a linear molecule and a cyclic molecule (s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s)

Hereinafter, each element (A) to (C) are described in detail. <<(A) Polyol Having Three or More OH Groups>>

A polyol used herein means a material having two or more OH groups and having two or more repeating units.

Examples of the polyols may include, but are not limited to, polycarbonatepolyols, polyether polyols, polyester polyols, polyolefin polyols, block copolymers or graft copolymers comprised of a plural kinds of polyols (for example, polyols comprising polyester, which is block-polymerized into polyether polyols) and the like.

Examples of the polycarbonate polyols may include polycarbonate diols formed from a polycondensate obtained by ester exchange reaction between ethylene carbonate and diol (examples of the diol component include ethylene glycol, 1,3-propanediol, 1,4-butanediol, 1,5-pentanediol, 1,6-hexandiol, 1,7-heptanediol, 1,8-octanediol, 1,9-nonanediol, 1,10-decanediol, 1,11-undecanediol, 1,12-dodecanediol, 2-ethyl-1,6-hexandiol, 2-methyl-1,3-propanediol, 3-methyl-1,5-pentanediol and 2,4-diethyl-1,5-pentanediol, 2,2-dimethyl-1,3-propanediol, 1,4-dihydroxyethylcyclohexane, isosorbide, spiroglycol, 2,5-bis(hydroxymethyl)tetrahydrofuran, 4,4'-isopropylidene dicyclohexanol, m- or p-xylylene glycol, bisphenol A); polycarbonate triols obtained by using also a compound having three hydroxyl groups at the time of the above ester exchange reaction; polycarbonate tetraols obtained by using also a compound having 4 hydroxyl groups at the time of the above ester exchange reaction; and the like. As the compound having three hydroxyl groups, trimethylolpropane, trimethylolethane, glycerin, tri-(2-hydroxyethyl)isocyanurate and the like can be used. As the compound having four hydroxyl groups, pentaerythritol, ditrimethylolpropane and the like can be used.

Examples of the polyether polyols may include polypropylene glycol, polyethylene glycol, polytetramethylene glycol, aromatic polyether ether ketone and copolymers thereof, and the like.

Examples of the polyester polyols may include polycaprolactone polyol, polylactic acid polyol, polyethylene adipate polyol, polybutylene adipate polyol, and copolymers thereof, and the like.

Examples of the polyolefin polyols may include polybutadiene polyol, polyisoprene polyol, and copolymers thereof, and the like.

The composition used for a polyurethane foam according to the present invention comprises a (A) polyol having three or more OH groups among polyols.

One of the polyols may be used or two or more of the polyols may be used in combination.

The polyol having three or more OH groups may be a polycarbonate polyol having three or more OH groups or a polyether polyol having three or more OH groups.

The composition used for a polyurethane foam according to the present invention may comprise mixed polyols which comprises the (A) polyol having three or more OH groups.

The mixed polyols may comprise at least one (A) polyol having three or more OH groups, and another polyol (or the other polyols). Furthermore, the another polyol (or the other polyols) can be selected from the above-described polyols.

In the composition used for a polyurethane foam according to the present invention, when the mixed polyols are used, an amount of the (A) polyol having three or more OH groups may range from 20 to 90 parts by weight, preferably 30 to 85 parts by weight, more preferably 40 to 80 parts by weight in 100 parts by weight of the mixed polyols.

The (A) polyol having three or more OH groups contained in the composition used for a polyurethane foam according to the present invention; and/or the other polyols may preferably be in the form of liquid. In particular, the polyols may be in the form of liquid at the foam forming temperature when forming a polyurethane foam, and may be in the form of liquid specifically at 20 to 60° C., preferably 25 to 50° C., more preferably 30 to 45° C.

The average molecular weight of the (A) polyol having three or more OH groups contained in the composition used for a polyurethane foam according to the present invention; and the other polyols may range from 250 to 8000, preferably 800 to 6000, and more preferably 1000 to 4000.

Furthermore, unless the description that the average molecular weight is a number average molecular weight or a weight average molecular weight is noted, the average molecular weight is a value determined by (m×1000×56/OHV), wherein OHV (mg KOH/g) (hereinafter, the unit of OHV is mg KOH/g unless otherwise noted) is a hydroxyl value measured in accordance with JIS K 0070 and m represents the number of OH groups per polyol molecule.

<<(B) A Compound Having Two or More Isocyanate Groups>>

The composition used for a polyurethane foam according to the present invention comprises a (B) compound having two or more isocyanate groups.

As the compound, known aliphatic, alicyclic and aromatic isocyanates may be used, or those which are newly synthesized may be used.

Examples of the (B) compound having two or more isocyanate groups may include, but are not limited to, hexamethylene diisocyanate (HDI), dodecamethylene diisocyanate, 2,2,4-trimethylhexamethylene diisocyanate, lysine diisocyanate, 2,6-diisocyanato methylcaproate, bis(2-isocyanatoethyl)fumarate, bis(2-isocyanatoethyl)carbonate, 2-isocyanatoethyl-2,6-diisocyanatohexanoate, isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene, 1,3- and/or 1,4-phenylene diisocyanate, 2,4- and/or 2,6-tolylenediisocyanate (TDI), crude TDI, 2,4'- and/or 4,4'-diphenylmethane diisocyanate (MDI), 4,4'-diisocyanato biphenyl, 3,3'-dimethyl-4,4'-diisocyanato biphenyl, 3,3'-dimethyl-4,4'-diisocyanato diphenylmethane, crude MDI, 1,5-naphthalene diisocyanate, m- and/or p-xylylene diisocyanate (XDI), $\alpha,\alpha,\alpha',\alpha'$-tetramethyl xylylene diisocyanate (TMXDI), and the like, as well as the derivatives or polymer thereof.

The (B) compound having two or more isocyanate groups may be preferably 2,4- and/or 2,6-tolylenediisocyanate (TDI), crude TDI, 2,4'- and/or 4,4'-diphenylmethane diisocyanate (MDI), crude MDI, m- and/or p-xylylene diisocyanate (XDI).

An amount of the compound having two or more isocyanate groups may be in a range as described below.

An amount of the compound having two or more isocyanate groups, an amount of the composition used for a polyurethane foam and/or an amount of mixed polyols may be adjusted so that a ratio of a molar amount of isocyanate groups in the compound having two or more isocyanate groups to a molar amount of active hydrogens in the composition used for a polyurethane foam, i.e. (a molar amount of isocyanate groups in the (B) compound having two or more isocyanate groups)/(a molar amount of active hydrogens in the composition used for a polyurethane foam) may range from 0.50 to 1.80, preferably 0.70 to 1.60 and more preferably 0.80 to 1.20.

Furthermore, the ratio (a molar amount of isocyanate groups in the (B) compound having two or more isocyanate groups)/(a molar amount of active hydrogens in the composition used for a polyurethane foam) can be represented as "NCO index".

The active hydrogen in the composition used for a polyurethane foam means a hydrogen which can react with isocyanate groups contained in the composition used for a polyurethane foam except the "(B) compound having two or more isocyanate groups".

Specific examples thereof may include a hydrogen in OH groups existing in polyols, a hydrogen in OH groups existing in polyrotaxanes, and the like. Further, not only a hydrogen derived from OH groups but also a hydrogen which can react with isocyanate groups existing in groups other than "OH groups" existing in polyols of mixed polyols and polyrotaxanes, more specifically a hydrogen in e.g., thiol groups, primary amino groups, secondary amino groups and carboxylic groups act as the active hydrogen, and thus the total molar amount thereof is the "molar amount of active hydrogens in the composition used for a polyurethane foam".

When the active hydrogen is derived from only OH groups, the amount of active hydrogens can be represented by a hydroxyl value OHV. Furthermore, when the active hydrogen is derived from only OH groups, the "molar amount of active hydrogens in the composition used for a polyurethane foam" can be obtained from the amount of each component having a hydrogen which can react with isocyanate groups contained in the composition used for a polyurethane foam, and the OHV value of each component.

<<(C) Polyrotaxane>>

The composition used for a polyurethane foam according to the present invention comprises a (C) polyrotaxane.

The (C) polyrotaxane is comprised of a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s).

The (C) polyrotaxane may be prepared by a method described in, for example, WO2005/080469, WO2010/024431 and the like.

An amount of the (C) polyrotaxane may be 1.0 to 15.0 parts by weight, preferably 3.0 to 12.0 parts by weight, more preferably 4.0 to 11.0 parts by weight, most preferably 5.0 to 10.0 parts by weight against 100 parts by weight of the mixed polyols.

Hereinafter, a cyclic molecule, a linear molecule, and a capping group which are components of (C) polyrotaxane will be described.

<C-1. Cyclic Molecule>

The cyclic molecule of the (C) polyrotaxane is not limited as long as the cyclic molecule may be cyclic, and may have a cavity, and a linear molecule is included in the cavity (cavities) of the cyclic molecules in a skewered manner.

The cyclic molecule may have 1) a hydrophobic modifying group; and 2) at least one functional group selected from the group consisting of —OH, —NH$_2$ and —SH.

Examples of the 1) hydrophobic modifying group may include, but are not limited to, groups having a hydrophobic group such as an acetyl group, a butyl ester group, a hexyl ester group, an octadecyl ester group, a polycaprolactone group, a poly(δ-valerolactone) group, a polylactic acid group, a polyalkylene carbonate group, a polypropylene glycol group, a polytetramethylene glycol group, a polymethyl acrylate group, a polyethylhexyl acrylate group, and the like. Among them, a polycaprolactone group and a polyalkylene carbonate group are preferable.

The cyclic molecule may comprise 2) at least one functional group selected from the group consisting of —OH, —NH$_2$, and —SH in addition to the "1) hydrophobic modifying group".

The functional group may be directly bonded to the cyclic molecule or may be bonded to the cyclic molecule via the "1) hydrophobic modifying group".

The 1) hydrophobic modifying group may be a hydrophobic modifying group derived from caprolactone, and the 2) functional group may be —OH.

The cyclic molecule may be, for example, selected from the group consisting of α-cyclodextrin, β-cyclodextrin and γ-cyclodextrin.

The above-described 1) hydrophobic modifying group; and/or the 2) functional group may be obtained by substituting with a part of —OH groups in α-cyclodextrin and the like.

Furthermore, examples of other linking groups may include, but are not limited to, alkylene groups, hydroxyalkylene groups and the like.

<C-2. Linear Molecule>

The linear molecule of the (C) polyrotaxane is not limited as long as the linear molecule may be included in a cavity (cavities) of the cyclic molecule (s) in a skewered manner.

For example, the linear molecule may include polyvinyl alcohol, polyvinylpyrrolidone, poly(meth)acrylic acid, cellulose-based resins (carboxymethylcellulose, hydroxyethylcellulose, hydroxypropylcellulose and the like), polyacrylamide, polyethylene oxide, polyethylene glycol, polypropylene glycol, polyvinyl acetal-based resins, polyvinyl methyl ether, polyamine, polyethyleneimine, casein, gelatin, starch and the like and/or copolymers thereof, polyolefin-based resins such as polyethylene, polypropylene, and copolymer resins with other olefinic monomers, polyester resins, polyvinyl chloride resins, polystyrene-based resins such as polystyrene, acrylonitrile-styrene copolymer resin and the like, acrylic resins such as polymethyl methacrylate, copolymer of (meth)acrylate, acrylonitrile-methyl acrylate copolymer resin and the like, polycarbonate resins, polyurethane resins, vinyl chloride-vinyl acetate copolymer resin, polyvinylbutyral resin and the like; and derivatives and modifications thereof, polyisobutylene, polytetrahydrofuran, polyaniline, acrylonitrile-butadiene-styrene copolymer (ABS resin), polyamides such as nylon and the like, polyimides, polydienes such as polyisoprene, polybutadiene and the like, polysiloxanes such as polydimethylsiloxane and the like, polysulfones, polyimines, polyacetic anhydrides, polyureas, polysulfides, polyphosphazenes, polyketones, polyphenylenes, polyhaloolefins, and derivatives thereof. For example, the linear molecule may be selected from the group consisting of polyethylene glycol, polyisoprene, polyisobutylene, polybutadiene, polypropylene glycol, polytetrahydrofuran, polydimethylsiloxane, polyethylene, polypropylene, polyvinyl alcohol and polyvinyl methyl ether. In particular, the linear molecule may be polyethylene glycol.

A weight average molecular weight of the linear molecule maybe 1,000 or more, preferably 3,000 to 100,000, more preferably 6,000 to 50,000.

In the polyrotaxane, the combination of (cyclic molecule, linear molecule) may be (one derived from α-cyclodextrin, one derived from polyethylene glycol).

<C-3. Capping Group>

The capping group of the (C) polyrotaxane is not limited, as long as the group is located at both ends of a pseudopolyrotaxane, and the group has a function of preventing dissociation of a cyclic molecule(s) from a linear molecule.

For example, the capping group may be selected from the group consisting of dinitrophenyl groups; cyclodextrins; adamantane groups; trityl groups; fluoresceins; silsequioxanes; pyrenes; substituted benzenes (example of the substituent may, include, but are not limited to, alkyl, alkyloxy, hydroxy, halogen, cyano, sulfonyl, carboxyl, amino, phenyl and the like. The substituent may be single or plural.); polycyclic aromatics which may be substituted (examples of the substituent may include, but are not limited to, those described above. The substituent may be single or plural); and steroids. Preferably, the capping group may be selected from the group consisting of dinitrophenyl groups; cyclodextrins; adamantane groups; trityl groups; fluoresceins; silsequioxanes; and pyrenes, more preferably adamantane groups or cyclodextrins.

<<Other Components>>

The composition used for a polyurethane foam according to the present invention comprises (A) a polyol having three or more OH groups; (B) a compound having two or more isocyanate groups; and (C) a polyrotaxane; as described above, and may comprise "other components" other than the (A) to (C) if necessary.

Examples of other components may include, but are not limited to, a foaming agent, a foam stabilizer, a catalyst, an antioxidant, a surface active agent, a flame retardant, a UV absorbing agent, a colorant, a variety of fillers and the like.

As the catalyst used to promote the reaction of (A) a polyol and/or (C) a polyrotaxane and (B) a compound having two or more isocyanate groups, a variety of known urethanation catalysts can be used. Examples thereof may include tertiary amines such as triethylamine, tripropylamine, tributylamine, N-methylmorpholine, N-ethylmorpholine, dimethylbenzylamine, N,N,N',N'-tetramethylhexamethylenediamine, N,N,N',N',N''-pentamethyldiethylenetriamine, bis-(2-dimethylaminoethyl)ether, N,N-dimethylethanolamine, N,N-diethylethanolamine, 1,8-diazabicyclo[5.4.0]undecene-7,1,5-diazabicyclo[4.3.0]nonene-5,1,5-diazabicyclo[4.4.0]decene-5; metal carboxylates such as potassium acetate andpotassium octylate; organometallic compounds such as stannous octoate, dibutyltin dilaurate, dioctyltin versatate, dioctyltin dilaurate, zinc naphthenate, bismuth trioctate (2-ethylhexanoic acid) and aluminum octylate, and the like. Among them, at least one of these catalysts may be added to the composition used for a polyurethane foam according to the present invention. The amount added may range from 0.01 to 5.0 mass % with respect to mixed polyols.

Further, examples of other components may include, but are not limited to, antistatic agents such as polyoxyethylene (18) octyl phenyl ether, polyoxyethylene sorbitan trioleate, polyoxyethylene(10) dodecyl ether, alkylsulfonic acid salt, tetraalkylbenzylammonium salt, and glycerin fatty acid ester; UV absorbing agents such as 2-ethylhexyl p-dimethylaminobenzoate, 2-ethylhexyl salicylate, 2,4-dihydroxybenzophenone, 2-hydroxy-4-n-octylbenzophenone, 2-(2'-hydroxy-5'-t-butylphenyl)benzotriazole, 2-ethylhexyl p-methoxycinnamate, isopropyl p-methoxycinnamate, and octyl methoxycinnamate; silver, zinc, copper compounds or complex or ions thereof; organosilicon compounds; antimicrobial agents such as organophosphorus compounds; antioxidants such as phenolic antioxidants, sulfur-based antioxidants, and phosphorus-based antioxidants; chain extenders such as ethylene glycol, propylene glycol, 1,4-butanediol, 1,5-pentanediol; flame retardants such as pentabromodiphenyl ether, decabromodiphenyl ether, tetrabromobisphenol A, hexabromocyclododecane, hexabromobenzene, triphenyl phosphate, aluminum hydroxide, and magnesium hydroxide; and the like.

In addition, the composition used for a polyurethane foam according to the present invention may comprise a solvent depending on the use application. After a production step, the solvent may preferably be removed.

Examples of the solvent may include, but are not limited to, acetone, methylethylketone, cyclohexanone, ethyl acetate, butyl acetate and the like.

<Foaming Agent, Foam Stabilizer>

Among the above "other components", particularly a foaming agent and a foam stabilizer may be added to the composition used for a polyurethane foam according to the present invention, and urethane may be foamed, to form foams.

The foaming agent has an action of generating gas, which becomes cells in a polyurethane foam. As the foaming agent, water is generally used.

Furthermore, examples of foaming agents other than water may include, but are not limited to, formic acid, carbon dioxide, hydrocarbon compounds, halogenated alkane compounds or mixtures thereof.

In a case where water is used as a foaming agent, water may be used in an amount of 0.5 to 10, preferably 1 to 5 parts by weight with respect to 100 parts by weight of polyol compound.

In a case where a hydrocarbon compound or a halogenated alkane compound is used as a foaming agent, it may be used in an amount of 5 to 75 parts by weight with respect to 100 parts by weight of polyol compound. In particular, water, carbon dioxide and cyclopentane are preferred because of a light burden on global environment.

The foam stabilizer has an action of stabilizing foams generated by a foaming agent. The foam stabilizer is not particularly limited as long as the action is shown.

Foam stabilizers such as a polyether polysiloxane used to produce a polyurethane foam can be suitably used as needed.

Examples thereof may include, but are not limited to, silicone-based surface active agents such as L-5340, L-5420, L-5421, L-6900 and L-580 manufactured by Momentive Performance Materials, SZ-1142, SZ-1642, SZ-1605, SZ-1649, SZ-1919, SH-190, SH-192, SH-193, SF-2945F, SF-2940F, SF-2936F, SF-2938F and SRX-294A manufactured by Dow Corning Toray Co., Ltd., F-305, F-341, F-343, F-374, F-345 and F-348 manufactured by Shin-Etsu Chemical Co., Ltd., B-2470F, B-2370F, B-8404, B-8407, B-8465, B-8444, B-8467, B-8433, B-8466, B-8870, B-8450 and B-8516 manufactured by Evonik. The amount added may range from 0.05 to 5.0 mass % with respect to mixed polyols.

<Polyurethane Foam>

The present application discloses a polyurethane foam, in particular, a polyurethane foam formed from the above-described composition used for a polyurethane foam.

The polyurethane foam according to the present invention can be produced by foaming and curing the above-described composition used for a polyurethane foam as a raw material using a known method or a novel method.

The apparent density of the polyurethane foam according to the present invention may range from 50 to 180 kg/m$^3$, preferably 70 to 160 kg/m$^3$, more preferably 80 to 140 kg/m$^3$.

Furthermore, the apparent density is calculated from the following formula by cutting out a rectangular parallelepiped from a polyurethane foam, and measuring the weight W (kg) and the length of three sides, vertical, horizontal and height L, M and H (m) thereof.

Apparent density (kg/m$^3$)=W/(L×M×H)

The compression set of the polyurethane foam according to the present invention may be 40% or less, preferably 35% or less, more preferably 20% or less.

The "compression set" used herein means one which is measured in accordance with JIS K6400-4 at 70° C. at a compression rate of 50% for 22 hours. Furthermore, the compression set can be measured by a conventionally known device.

The rebound resilience of the polyurethane foam according to the present invention may be 35% or less, preferably 30% or less, more preferably 28% or less, most preferably 26% or less.

Furthermore, the rebound resilience used herein means a value measured in accordance with JIS K6400-3:2011. Specifically, a test piece is prepared, and a copper ball is placed at a height of 500 mm from the test piece. The copper ball is allowed to fall from the height, and the rebounded height of the copper ball is measured, and (the rebounded height of the copper ball)/500 mm×100 is used as the rebound resilience (%).

The polyurethane foam according to the present invention may have preferably two or more properties of three properties, "apparent density", "compression set" and "rebound resilience", and more preferably may have all the above three properties. Furthermore, when having two or more properties or having all the three properties, each value of properties may be in the <Materials>

The present application discloses a material formed of one comprising the above-described polyurethane foam, a material consisting essentially of the above-described polyurethane foam, or a material consisting of the above-described polyurethane foam.

The material "formed of one comprising the above-described polyurethane foam" means that a material is formed of one comprising "the above-described polyurethane foam" but the material may have components other than "the above-described polyurethane foam".

Further, the material "consisting of the above-described polyurethane foam" literally means that a material is formed from only "the above-described polyurethane foam" and does not comprise components other than "the above-described polyurethane foam."

Furthermore, the material "consisting essentially of the above-described polyurethane foam" means that the main component of a material is "the above-described polyurethane foam" and may comprise components other than "the above-described polyurethane foam" without losing properties derived from "the above-described polyurethane foam."

The polyurethane foam according to the present invention has excellent viscoelasticity, specifically has properties of the above-described apparent density and/or compression set and/or rebound resilience, and has improved durability and improved softness. Therefore, a material formed of one comprising the polyurethane foam, a material consisting essentially of the polyurethane foam, or a material consisting of the polyurethane foam has the properties, and various applications exist.

Application examples of the materials according to the present invention can include cushioning materials. Specific examples of the cushioning materials can include, but are not limited to, sheets of transport vehicles such as motor vehicles, aircrafts and railways, sound absorbing and vibration damping materials for e.g., floors and ceilings, and interior materials; bedding such as mattresses, pillows, sofas, armrests and cushions, and furniture materials; industrial and electrical appliance cushioning materials including packing and sealing; shoe and clothing cushioning materials such as shoulder pads, ski boots, athletic shoes, boots and cold protection liners; cushioning materials and sound absorbing materials for audio equipment such as speaker supports and earphones; underlay materials for carpets and flooring, cushioning materials for walls, and architectural materials such as lagging and thermal insulating materials; helmets, polishing carriers, cleaning sponges, sporting goods, protector pads and sheets, a variety of filters, toys, packing materials and the like.

Further, the materials according to the present invention have an excellent touch and feeling, and thus can be used as a variety of cosmetic sponges, for example foundation application tools and applicators for e.g., blusher and eyeshadow.

In order to use the materials as a cosmetic sponge for applying foundation, the materials may be processed into planar shapes with a thickness of 4 to 20 mm, such as circle, square, ellipse and oval and used. The edges of a planar shape are preferably rounded by polishing process. In addition, the apparent density can be adjusted to the above-described range, particularly 70 to 160 kg/m$^3$, preferably 80 to 140 kg/m$^3$, and application tools with strong stiffness, good feeling and contact feeling, and a good feeling of use and application properties for cosmetics can be made.

In order to use the materials as an eyeshadow applicator, a sheet with a thickness of 1 to 3 mm is made, and two sheets are welded and melt-cut by thermal processing to make a pouched chip, to which a handle is attached, and the obtained product may be used. The materials according to the present invention have strong stiffness, good feeling and contact feeling, a good feeling of use, and moreover high welding strength, little molten substance on the melt-cut surface, and durability, and does not have a risk that a welded part causes a wound on skin.

<Method for Producing a Polyurethane Foam>

As described above, the polyurethane foam according to the present invention can be formed from the above-described composition used for a polyurethane foam by a known method.

The polyurethane foam according to the present invention can be produced specifically by the following method.

The polyurethane foam can be produced by comprising the steps of:

1) preparing (A) a polyol having three or more OH groups; 2) preparing (B) a compound having two or more isocyanate groups;

3) preparing (C) a polyrotaxane comprising a pseudopolyrotaxane, in which the linear molecule is included in a cavity (cavities) of the cyclic molecule (s) in a skewered manner, and capping groups, each of which locates at each end of the pseudopolyrotaxane in order to prevent the dissociation of the cyclic molecule(s); and 4) mixing the (A) polyol having three or more OH groups, the (B) compound having two or more isocyanate groups, the (C) polyrotaxane, a foaming agent, and a foam stabilizer, to foam and react the mixture.

The step 1) to step 4) will now be described.
<<Step 1)>>

The step 1) is a step of preparing (A) a polyol having three or more OH groups.

The "(A) polyol having three or more OH groups" has the same definition as above, and the above-described "polyols" may be used.

As described above, as the "polyol," "mixed polyols" are preferably used.

As polyols other than the "(A) polyol having three or more OH groups" and the "(A) polyol having three or more OH groups" in mixed polyols, commercially available ones or newly synthesized ones may be used.
<<Step 2)>>

The step 2) is a step of preparing (B) a compound having two or more isocyanate groups.

The "(B) compound having two or more isocyanate groups" has the same definition as above, and the above-described "(B) compounds having two or more isocyanate groups" may be used.

As the "(B) compound having two or more isocyanate groups" commercially available ones or newly synthesized ones may be used.
<<Step 3)>>

The step 3) is a step of preparing (C) a polyrotaxane. The "(C) polyrotaxane" has the same definition as above, and the above-described "(C) polyrotaxanes" may be used.

As the "(C) polyrotaxane" commercially available ones or newly synthesized ones may be used.

Furthermore, the order of steps 1) to 3) does not matter. The steps 1) to 3) can be carried out at the same time or successively, and when the steps are successively carried out, the steps can be carried out in any order.
<<Step 4) >>

The step 4) is a step of mixing the (A) polyol having three or more OH groups, the (B) compound having two or more isocyanate groups, the (C) polyrotaxane, a foaming agent and a foam stabilizer to foam and react the mixture.

In the step 4), the (B) compound having two or more isocyanate groups may be mixed last.

The step 4) can be carried out by a conventionally known means.

Of the step 4), the mixing step may be carried out in the presence of a solvent, if necessary. Furthermore, examples of solvents may include, but are not limited to, the above-described solvents.

Further, the mixing step can be carried out under temperature and pressure in a conventionally known means.

Furthermore, a conventionally known mixer can be used for mixing. As a mixing method, a normal or high pressure method can be used.

Of the step 4), the foaming and reacting step can be carried out under temperature, pressure and time in a conventionally known means.

The temperature may range from 20 to 60° C.

As described above, the (B) compound having two or more isocyanate groups may be mixed last, but mixing may be carried out in a short time after the (B) compound having two or more isocyanate groups is mixed. Specifically, the time may be within 30 seconds, preferably within 10 seconds, more preferably within 5 seconds until pouring into cast molding after mixing the compound having two or more isocyanate groups. Furthermore, a specific device and/or method may be, but is not limited to, for example, a device or method in which components other than (B) a compound having two or more isocyanate groups and the compound having two or more isocyanate groups are continuously supplied, mixed and discharged.

In the step 4), "other components" other than the above-described components may be mixed, if desired. Furthermore, examples of the "other components" may include, but are not limited to, "other components" previously described in the "composition used for a polyurethane foam" according to the present invention.

The present invention will be illustrated more specifically by way of following Examples, but is not limited thereby.

EXAMPLES

<A. Preparation of Polyrotaxane>

As a polyrotaxane, a commercially available product (trade name: SeRM Super Polymer SH1310P (manufactured by Advanced Softmaterials Inc.), weight average molecular weight: 180000, OHV=85) was used. Furthermore, for the commercially available product polyrotaxane, a linear molecule: polyethylene glycol (weight average molecular weight: 11000); a cyclic molecule: modified α-cyclodextrin (part of hydroxyl groups is substituted with hydroxypropyl groups and caprolactone groups are then added); and a capping group: an adamantane group; were used.

<Polyol>

The following polyol was used.

Polyoxyalkylene polyol (the number of functional groups: 3, OHV=50, molecular weight: 3360, SANNIX FA-103 (manufactured by Sanyo Chemical Industries, Ltd.));

Polypropylene glycol (the number of functional groups 2, OHV=56, molecular weight 2000, SANNIX PP-2000 (manufactured by Sanyo Chemical Industries, Ltd.))

(Example 1)

As a polyol blended liquid, 60 parts by weight of linear polypropylene glycol having hydroxyl groups on each end (the number of functional groups: 2, OHV=56, molecular weight: 2000, SANNIX PP-2000 (manufactured by Sanyo Chemical Industries, Ltd.); and 40 parts by weight of polyoxyalkylene polyol (the number of functional groups: 3, OHV=50, molecular weight: 3360, SANNIX FA-103 (manufactured by Sanyo Chemical Industries, Ltd.)); 6 parts by weight of ethylene glycol as a chain extender (converted OHV=1806); 10 parts by weight of the above-described polyrotaxane (OHV=85); 0.8 parts by weight of water as a foaming agent; 0.6 parts by weight of stannous octoate as a reaction catalyst; 2.0 parts by weight of silicone foam stabilizer; each were weighed. These were put into a mixing container equipped with an impeller type mixer, stirred and homogenously dispersed, to obtain a polyol-containing liquid. The liquid temperature was adjusted to 25° C.

To the polyol-containing liquid, 37 parts by weight of xylylene diisocyanate as an isocyanate (NCO index=1.0) was added at a liquid temperature of 25° C., and stirred and mixed in the high speed mode for 5 seconds.

Then, the liquid was adjusted to a temperature of 30° C. and poured into a mold having the opened upper surface, and reaction was carried out at an outer temperature of 25° C.

As the reaction proceeded, bubbles are generated and the liquid level rises, i.e., rise phenomenon was confirmed. Further, resinification proceeded to form a polyurethane foam UF-1 in the form of from liquid to solid. The cross-section of foam UF-1 was an almost square shape, and the yield of foam was high.

Then, the foam was taken out of the mold, and cured in an electric dryer adjusted to a temperature of 40° C. for 3 days. The surface skin was scraped to obtain a rectangular parallelepiped foam UF-1A. The foam UF-1A has fine and white bubbles and has excellent elasticity.

The foam UF-1A was sliced to a thickness of 10 mm, and the apparent density and compression set were measured. Furthermore, a 34=×27×10 mm rectangular parallelepiped was cut out, and the apparent density was measured by the above-described method. Further, the compression set was measured in accordance with JIS K6400-4 at 70° C. at a compression rate of 50% for 22 hours as described above.

Further, the foam UF-1A was cut out into a 100 mm×100 mm square, which was used as a test piece for the test of the rebound resilience. In the test, a copper ball is allowed to fall to the test piece from a height of 500 mm, and the rebound resilience was found from the rebounded height in accordance with JIS K6400-3:2011.

The measurement results of apparent density, compression set and rebound resilience are shown in Table 1.

The foam UF-1A was separately cut out into a disc with a diameter of 65 mm, and the edge was subjected to round processing by grind stone to obtain a cosmetic foundation application tool UF-1B. The foundation application tool UF-1B had good feeling and contact feeling due to the fineness and elasticity of bubbles. Further, the foundation application tool UF-1B had strong stiffness, and was excellent as a cosmetic sponge in terms of feeling and contact feeling and stiffness. More, when makeup was actually made by applying powder foundation, the foundation could be uniformly applied without unevenness, and the foam was very excellent as a cosmetic sponge. Furthermore, feeling and contact feeling, stiffness, and uniformity of application were based on a relative organoleptic examination to compare foundation application tools obtained in Example 2, Example 3 and Comparative Example 1 described below.

The results of the organoleptic examination for feeling and contact feeling and stiffness are also shown in Table 1.

TABLE 1

Compositions and Properties of Examples 1 to 3 and Comparative Example 1

| Composition | Example 1 | Example 2 | Example 3 | Comparative Example 1 |
|---|---|---|---|---|
| Bifunctional polyol PPG 2000 | 60 | 60 | 60 | 60 |
| Trifunctional polyol FA-103 | 40 | 40 | 40 | 40 |
| Ethylene glycol | 6 | 6 | 6 | 6 |
| Polyrotaxane | 10 | 6 | 3 | 0 |

TABLE 1-continued

Compositions and Properties of Examples 1 to 3 and Comparative Example 1

| Composition | Example 1 | Example 2 | Example 3 | Comparative Example 1 |
|---|---|---|---|---|
| Water | 0.8 | 0.8 | 0.8 | 0.8 |
| Stannous octoate | 0.6 | 0.6 | 0.6 | 0.6 |
| Silicone foam stabilizer | 2 | 2 | 2 | 2 |
| Xylylene diisocyanate | 37 | 36.5 | 36 | 35.5 |
| Properties of polyurethane foam | | | | |
| Apparent density (kg/m$^3$) | 117 | 116 | 115 | 111 |
| Compression set (%) | 1.5 | 16 | 38 | 42 |
| Rebound resilience (%) | 26 | 26 | 28 | 31 |
| Feeling · contact feeling | ⊚ | ⊚ | ○ | Δ |
| Stiffness | ⊚ | ○ | ○ | Δ |

⊚: very good,
○: good,
Δ: slightly bad, and
×: very bad.

(Example 2)

In Example 2, a polyurethane foam UF-2 was prepared in a manner similar to the method in Example 1, except that the amount of polyrotaxane in Example 1: 10 parts by weight was changed to 6 parts by weight, and that xylylene diisocyanate was 36.5 parts by weight so that the NCO index would be 1.00. The properties (apparent density, compression set and rebound resilience) of the foam UF-2 were measured. The results are shown in Table 1.

Further, a foundation application tool UF-2B was obtained from the polyurethane foam UF-2 in Example 2 in a manner similar to Example 1. In comparison with the foundation application tool UF-1B in Example 1, the application tool UF-2B was slightly inferior in terms of stiffness, but very excellent as a cosmetic sponge.

(Example 3)

In Example 3, a polyurethane foam UF-3 was prepared in a manner similar to the method in Example 1, except that the amount of polyrotaxane in Example 1: 10 parts by weight was changed to 3 parts by weight, and that xylylene diisocyanate was 36 parts by weight so that the NCO index would be 1.00. The properties (apparent density, compression set and rebound resilience) of the foam UF-3 were measured. The results are shown in Table 1.

Further, a foundation application tool UF-3B was obtained from the polyurethane foam UF-3 in Example 3 in a manner similar to Example 1. In comparison with the foundation application tool UF-1B in Example 1, the application tool UF-3B was slightly inferior in terms of feeling and contact feeling and stiffness, but excellent as a cosmetic sponge.

(Comparative Example 1)

In Comparative Example 1, a polyurethane foam UF-C1 was prepared in a manner similar to the method in Example 1, except that the amount of polyrotaxane in Example 1: 10 parts by weight was changed to 0 parts by weight, and that xylylene diisocyanate was 35.5 parts by weight so that the NCO index would be 1.00. The properties (apparent density and compression set) of the foam UF-C1 were measured. The results are shown in Table 1.

Further, a foundation application tool UF-C1B was obtained from the polyurethane foam UF-C1 in Comparative Example 1 in a manner similar to Example 1. Unlike the foundation application tool UF-1B in Example 1, the application tool UF-C1B did not have good feeling and contact feeling, and was inferior in terms of stiffness. The state of applied foundation was also not good because a phenomenon in which lines were partly drawn was observed, and the application tool UF-C1B was inferior as a cosmetic sponge.

Table 1, in particular, Example 1 and Comparative Example 1 in Table 1 shows the following:

A polyurethane foam (in particular, one in Example 1) produced from the composition used for a polyurethane foam according to the present invention has properties of low rebound resilience but excellent compression set, that is, low settling and good durability compared to a conventional polyurethane foam having the same degree of apparent density (in particular, one in Comparative Example 1). Further, it is found that the polyurethane foams produced in the Examples shows properties of strong stiffness, good feeling and contact feeling, compared to the polyurethane foam produced in Comparative Example 1.

What is claimed is:

1. A polyurethane foam derived from a composition used for a polyurethane foam comprising:
   (A) a polyol having three or more OHgroups;
   (B) a compound having two or more isocyanate groups; and
   (C) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s),
   wherein the (A) polyol having three or more OH groups is comprised in a mixed polyols,
   an amount of the (A) polyol having three or more OH groups ranges from 20 to 90 parts by weight in 100 parts by weight of the mixed polyols, an apparent density of the polyurethane foam ranges from 80 to 180 kg/m$^3$; and a
   compression set of the polyurethane foam, measured in accordance with JISK6400-4 at 70° C. at a compression rate of 50% for 22 hours, is 40% or less.

2. The polyurethane foam according to claim 1, wherein the apparent density of the polyurethane foam ranges from 80 to 160 kg/m$^3$.

3. The polyurethane foam according to claim 1, wherein the compression set of the polyurethane foam is 35% or less.

4. A material formed of one comprising the polyurethane foam according to claim 1.

5. The material according to claim 4, wherein the material is a cosmetic sponge.

6. The material according to claim 4, wherein the material is a cushioning material.

7. A method for producing a polyurethane foam comprising the steps of:
   1) preparing (A) a polyol having three or more OH groups;
   2) preparing (B) a compound having two or more isocyanate groups;
   3) preparing (C) a polyrotaxane comprising a pseudopolyrotaxane, which has a linear molecule and a cyclic molecule(s) in which the linear molecule is included in a cavity (cavities) of the cyclic molecule(s) in a skewered manner, and capping groups, each of which locates at each end of the pseudopolyrotaxane in order to prevent the dissociation of the cyclic molecule(s); and
   4) mixing the (A) polyol having three or more OH groups, the (B) compound having two or more isocyanate groups, the (C) polyrotaxane, a foaming agent, and a foam stabilizer, to foam and react the mixture;

to obtain the polyurethane foam, wherein the (A) polyol having three or more OH groups is comprised in a mixed polyols, an amount of the (A) polyol having three or more OH groups ranges from 20 to 90 parts by weight in 100 parts by weight of the mixed polyols, an apparent density of the polyurethane foam ranges from 80 to 180 kg/m$^3$; and a compression set of the polyurethane foam, measured in accordance with JISK6400-4 at 70° C. at a compression rate of 50% for 22 hours, is 40% or less.

\* \* \* \* \*

UNITED STATES PATENT AND TRADEMARK OFFICE
CERTIFICATE OF CORRECTION

PATENT NO. : 11,053,367 B2
APPLICATION NO. : 16/072866
DATED : July 6, 2021
INVENTOR(S) : Y. Hayashi et al.

It is certified that error appears in the above-identified patent and that said Letters Patent is hereby corrected as shown below:

In the Claims

| Column | Line | |
|---|---|---|
| 16 | 22 | Claim 1 change "OHgroups" to -- OH groups --. |

Signed and Sealed this
Twenty-third Day of August, 2022

*Katherine Kelly Vidal*

Katherine Kelly Vidal
*Director of the United States Patent and Trademark Office*